Oct. 12, 1971     S. F. ALLINA     3,611,685
GRASS CATCHER ASSEMBLY
Filed Dec. 4, 1967     2 Sheets-Sheet 1
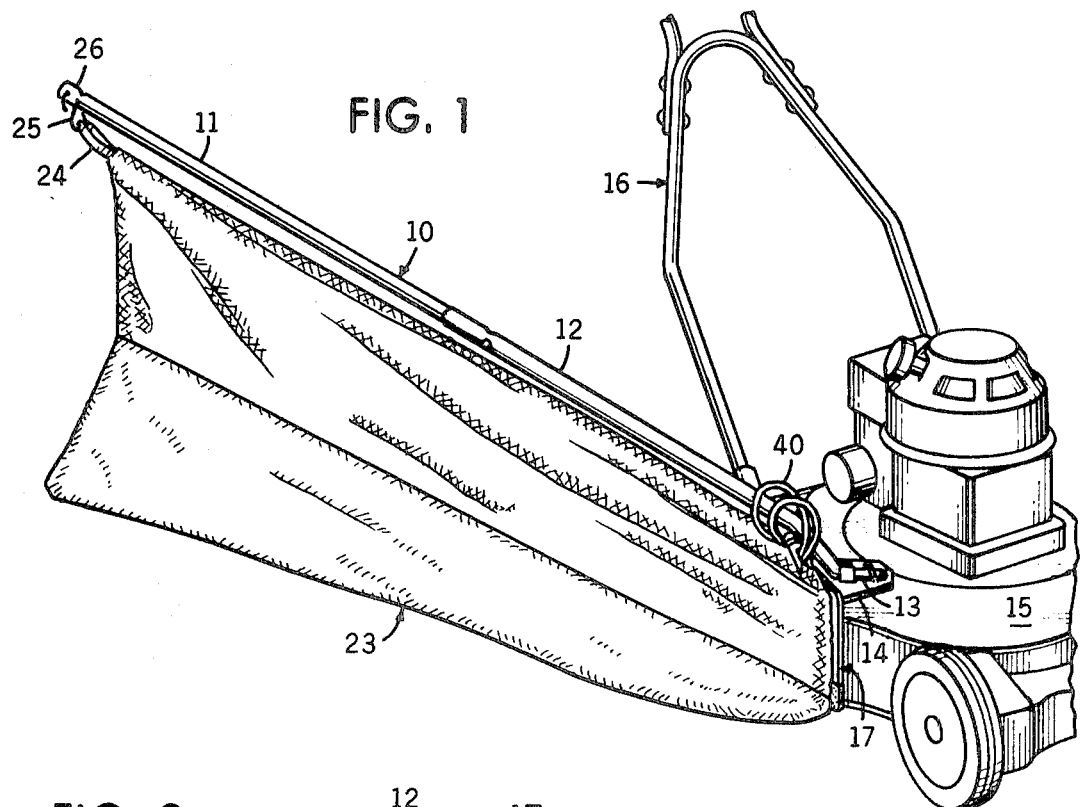
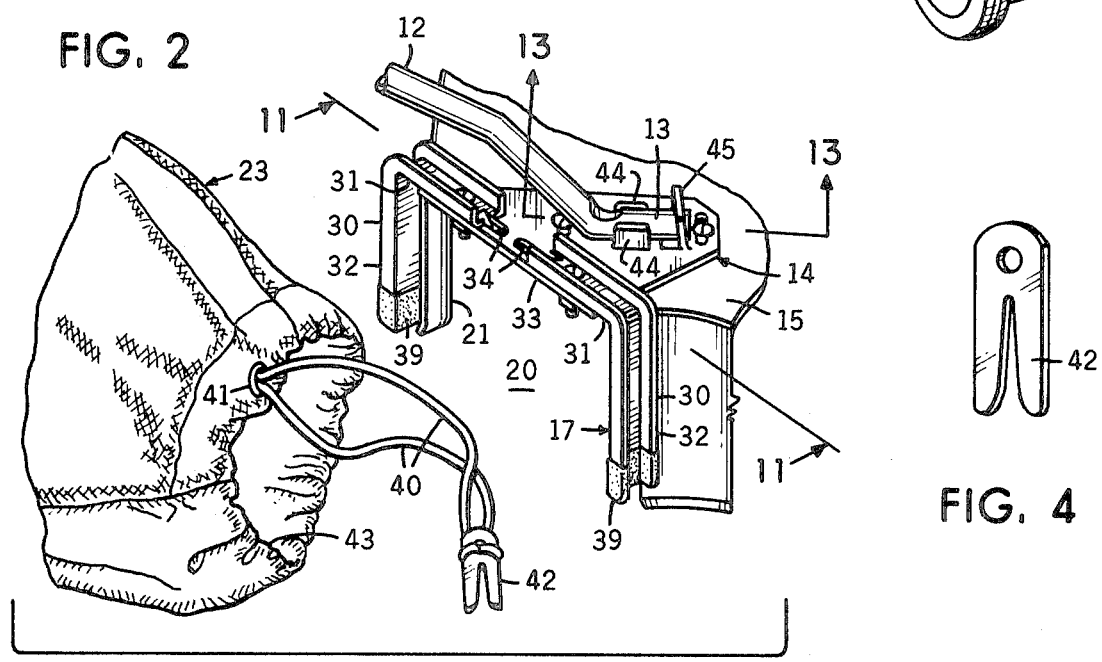
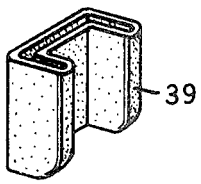
INVENTOR
STANLEY F. ALLINA
BY
Cohn and Powell
ATTORNEYS

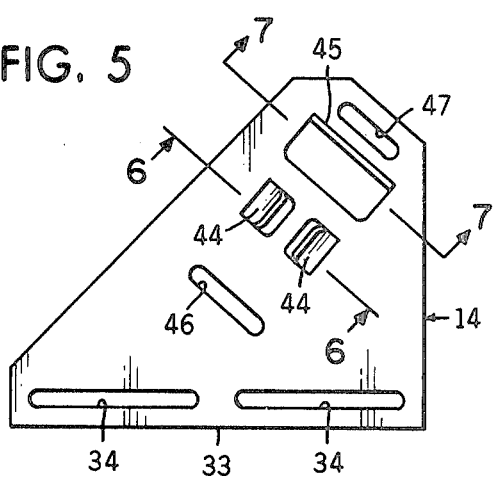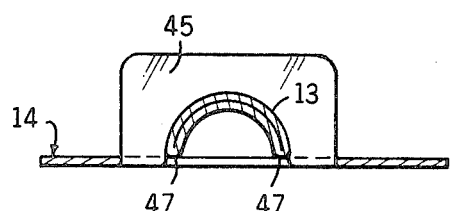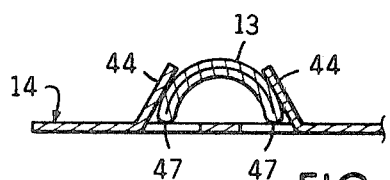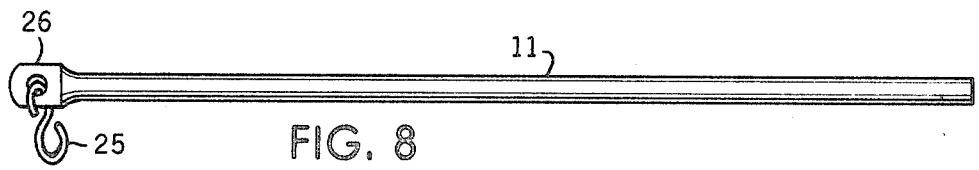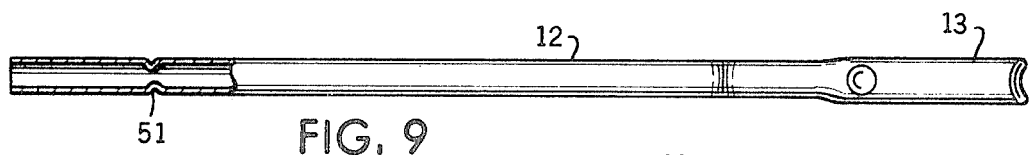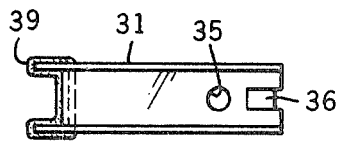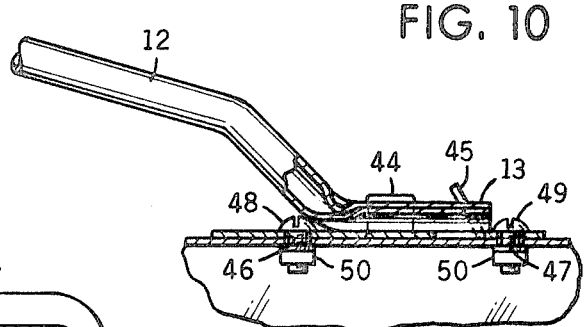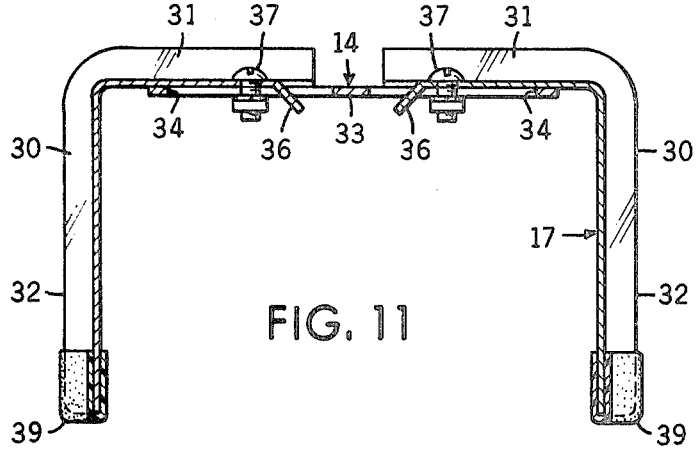

United States Patent Office 3,611,685
Patented Oct. 12, 1971

3,611,685
GRASS CATCHER ASSEMBLY
Stanley F. Allina, Ladue, Mo., assignor to The Perfection Manufacturing Company, St. Louis, Mo.
Filed Dec. 4, 1967, Ser. No. 687,700
Int. Cl. A01d 53/06
U.S. Cl. 56—202
7 Claims

ABSTRACT OF THE DISCLOSURE

The grass catcher bag assembly includes an adaptor plate attached to the lawn mower housing above the discharge orifice, and a single cantilever support arm constructed in two parts and attached to the adaptor plate. The adaptor plate includes an overhanging support member to which angle-shaped frames are adjustably attached. The angle-shaped frames and the adaptor plate cooperate to form a substantially U-shaped frame in register with the discharge orifice and adapted to receive the open end of the bag. The other end of the bag attaches to the outer end of the cantilever support arm. The adaptor plate includes a pair of tabs engaging the inner end of the support arm and a socketed lug spaced from the tabs and engaging the inner end of the support arm to provide a couple attachment means securing the support arm to the adaptor plate.

BACKGROUND OF THE INVENTION

This invention relates generally to a grass catcher bag assembly, and more particularly to an assembly for attachment of the bag to the grass discharge chute of a rotary lawn mower housing.

Grass catcher attachments for lawn mowers are not unknown in the art, but none of the known attachments have either the simplicity, the construction or demonstrate the ease of attachment as the present catcher. The present assembly is provided, for example, with a cantilever arm which, though formed from a single tube, is nevertheless not susceptible to rotation at its attached end. Prevention of rotation has, in the past, virtually required the use of a double arm. Moreover, in the present assembly, the supporting arm is external to the catcher bag which facilitates the removal of the bag for emptying purposes. Since the bag may require emptying several times in the course of one mowing, quick and easy bag removal is advantageous. In order to facilitate the removal of the bag, the support arm is in two parts.

By the use of an adaptor plate, which is permanently attached to the housing of the mower, the other parts of the assembly may be very conveniently removably attached to the mower as easily as though fittings had been provided for this purpose directly on the lawn mower housing.

Because of the large number and variety of rotary lawn mowers, it is absolutely essential that a commercial bag assembly of this type be adjustable to accommodate various sizes of grass discharge chute. In order to provide this adjustment, it has been common in the past to utilize a rectangular frame having four extensible sides. This old type framing has been simplified considerably by providing an inverted U-shaped frame rather than a rectangular one.

SUMMARY OF THE INVENTION

The grass catcher bag assembly includes an adaptor plate attached to the lawn mower housing above the discharge orifice and partially framing the discharge orifice.

A single cantilever support arm including outer and inner ends is attached to the adaptor plate and supports the bag.

Side framing means is adjustably attached to and cooperates with the adaptor plate to form a substantially U-shaped orifice frame receiving the open end of the bag. The inner end of the support arm is attached to the adaptor plate by an attachment means which provides a couple stabilizing the arm, and which prevents rotation of the arm.

The adaptor plate includes an overhanging support member for the side framing means. The side framing means includes opposed angle-shaped frame, each frame having one horizontal leg member attached to the support member and a depending vertical leg member substantially in register with the orifice. Each horizontal leg member is connected to the support member in selectively extensible relation, one of the last said members is provided with a slot, the other of the last said members is provided with a hole and a guide finger. Fastener means extend through the hole and slot to interconnect the last said members, and the finger engages the member defining the slot to guide the direction of extension.

The attachment for the support arm includes a first lug means having a pair of opposed tabs embracingly engaging the inner end of the support arm, and a second lug means having an arcuate socket receiving the inner end of the support arm. Each lug means engages the inner end of the support arm to provide a couple resistance to movement of the support arm. The inner end of the support arm is substantially semi-circular in cross section and conforms substantially to the configuration of the socket. The inner end includes a pair of elongate edges bearing on the adaptor plate between the first and second lug means.

The support arm is in two parts removably connected in telescopic relation.

The angle-shaped frames are substantially channel-shaped in cross section.

BRIEF DESCRIPTION OF THE DRAWING

FIG. 1 is a fragmentary perspective view of the grass catcher assembly attached to a side opening rotary lawn mower housing;

FIG. 2 is a fragmentary perspective view of the discharge chute framing, the open end of the catcher bag being in close proximity thereto;

FIG. 3 is a perspective view of the protective plastic caps fitted to each end of the frame;

FIG. 4 illustrates a metal clip used to secure the drawstring of the catcher bag in a closed position;

FIG. 5 is a plan view of the adaptor plate;

FIGS. 6 and 7 are sectional views taken on lines 6—6 and 7—7 respectively of FIG. 5;

FIG. 8 is an elevational view of the outer part of the cantilever support arm;

FIG. 9 is a plan view, partly in section, of the inner part of the cantilever support arm;

FIG. 10 is a view of the underside of the inner end thereof;

FIG. 11 is a sectional view taken on line 11—11 of FIG. 2, illustrating the assembled U-shaped frame;

FIG. 12 is a plan view of one of the angle-shaped frames thereof; and

FIG. 13 is a fragmentary view, partly in cross section, of the connection of the inner end of the cantilever support arm to the adaptor plate.

DESCRIPTION OF THE PREFERRED EMBODIMENT

Referring now by characters of reference to the drawing, and first to FIG. 1, it will be understood that the grass catcher assembly includes an elongate cantilever support arm 10, having an outer part 11 and an inner part 12. The support arm 10 is attached at its inner end 13 to an adaptor plate 14. The adaptor plate 14 is in turn connected to the housing 15 of a rotary lawn mower 16.

A U-shaped frame 17 disposed about the orifice 20 of the discharge chute 21 (FIG. 2) serves to interconnect the open end of the catcher bag 23 to the discharge chute 21. The outer end of the catcher bag 23 is provided with a loop 24 at its upper corner, the loop 24 being connected to an S-shaped hook 25 attached to the flattened outer end 26 of the support arm 10.

FIG. 2 illustrates in some detail the substantially U-shaped frame 17. It will be understood that a pair of opposing angle-shaped frames 30, each including a horizontal leg member 31 and a vertical leg member 32 are adjustably connected to an overhanging support member 33 of the adaptor plate 14. The adaptor plate 14 is connected to the mower housing 15 above the discharge chute 21. A pair of oppositely disposed elongate slots 34, parallel to the margin of the overhanging support member 33, permit adjustment of the disposition of the angle-shaped frames 30 relative to each other. The substantially U-shaped frame 17, provided by the angle-shaped frames 30 and the overhanging support member 33 of the adaptor plate 14, constitute a variable framing means which may be adapted to suit the orifice opening 20 of the particular mower to which the catcher bag assembly is to be attached.

Turning now to FIGS. 11 and 12, the adjustment feature will become more apparent. The upper leg member 31 of each angle-shaped frame 30 includes a hole 35 which is disposed in register with its associated slot 34. Each angle-shaped frame 30 is connected to the adaptor plate 14 by means of a fastener 37 extending through the hole 35 and its associated slot 34. A downwardly projecting finger 36 disposed along the horizontal leg member 31 in spaced relation from the hole 35 engages the support member 33 defining the slot 34 and constitutes a guide means aligning the angle-shaped frame 30 with the overhanging support member 33 of the adaptor plate 14. It will be observed that the engagement of the finger 36 in the slot 34 provides a stop means preventing pivotal rotation of the angle-shaped frame 30 about the fastener 37.

Returning now to FIG. 2, it is apparent that the bag 23 is provided at its open end 43 which a drawstring 40 issuing from a grommet 41, the drawstring 40 including a drawstring clip 42. When the open end 43 of the bag 23 is placed over the substantially U-shaped frame 17 and the drawstring 40 is in aligned juxtaposition with the channel-shaped angle-shaped frames 30, the drawstring 40 may be pulled tight into the channel of the framing means. The bag 23 is thereby retained in position relative to the framing means. It will be observed that the corners of the angle-shaped frames 30 are rounded to prevent chafing of the bag. Plastic protector caps 39 are provided for the end of each vertical leg member 32 to accomplish the same purpose.

The attachment of the inner part 12 of the cantilever support arm 10 to the adaptor plate 14 is illustrated in FIG. 2. The inner end 13 of the inner part 12 is substantially inclined relative to that part 12. The inner end 13 is deformed from its original circular tubular shape into a substantially semi-circular configuration. This semi-circular configuration permits the tube to be laid flat against the adaptor plate 14. This will be more clearly understood by considering FIG. 2 in conjunction with FIGS. 5, 6 and 7. FIG. 5 illustrates with particularity the upwardly projecting lugs 44 and 45 which constitute an attachment means securing the inner end 13 to the adaptor plate 14.

Tabs 44 are upwardly disposed on either side of the semi-circular inner end 13, and are inclined, as shown in FIG. 7, inwardly toward each other to provide a retaining means for the inner end 13. A lug 45 is provided disposed in spaced relation from the tabs 44 along the length of the inner end 13. The lug 45 includes a semi-circular aperture 46 constituting a socket compatibly shaped to receive and engage the inner end 13.

This arrangment of the lugs, which constitutes an attachment means, provides a couple which precludes movement of the inner end 13 axially and in a direction transverse to the axis. Because the lower margins 47 of the semi-circular end 13 bear on the adaptor plate 14, the inner end 13 is precluded from rotating. Further, the embracing nature of the engagement of the tabs 44 and the spaced lug 45 with the inner end 13 provides a couple which restrains vertical and horizontal movement of the inner end 13.

A pair of spaced elongate slots 46 and 47 provides a means of attaching the adaptor plate 14 to the lower housing 15. This attachment is accomplished by simply positioning the adaptor plate 14 in its correct location and, using the adaptor plate 14 as a template, punching a pair of oppositely spaced holes 48 and 49 respectively in the lawn mower housing 15. A pair of fasteners 50 extend through the adaptor plate slots 46 and 47 and through the housing holes 48 and 49 respectively, to secure the adaptor plate 14 to the housing 15. This arrangement is clearly illustrated in FIG. 13.

From FIGS. 8 and 9 it will be understood that the diameter of the outer part 11 of the support arm 10 is smaller than that of the inner part 12. Thus, the outer part 11 may be partially telescoped into the outer end of the inner part 12. The outer part 12 is provided with a pair of dimples 51 disposed in spaced relation from the outer end of the inner part 12, thereby providing stop means precluding further telescopic reception of the outer part 11 in the inner part 12.

It is thought that the functional advantages of the grass catcher assembly have become fully apparent from the foregoing description of parts, but for completeness of description, the installation and usage of the assembly will be briefly described.

Plastic caps 40 are positioned at the lower end of each vertical leg member 32. Each angle-shaped frame 30 is then connected to the adaptor plate 14 by inserting the finger 36 into its associated slot 34 and connecting the angle-shaped frame 30 to the adaptor plate 14 by means of fastener 37, which is then adjusted to finger tightness. The substantially U-shaped frame 17 provided by the two opposed angle-shaped frames 30 and the adaptor plate 14 is then placed in framing relation to the orifice 20 of the discharge chute 21. The angle-shaped frames 30 are extended or retracted as required until the U-shaped frame 17 is in substantial register with the orifice 20. When this register has been achieved and the U-shaped frame 17 substantially abuts the orifice margin, the adaptor plate slots 46 and 47 may be used as a template to mark the location of the holes 48 and 49 respectively in the housing 15, whereby to attach the adaptor plate 14 to the housing 15. It will be understood that the framing means and the adaptor plate 14 are, when once located, effectively a part of the lawn mower housing.

The two parts 11 and 12 of the support arm 10 are assembled together, and the semi-circular inner end 13 is connected to the adaptor plate 14 by sliding the inner end 13 between the opposed tabs 44 until its extremity is slidably received within the semi-circular socket 46 provided in the lug 45. It will be understood that a frictional push-fit relationship exists between the tubular support arm 10 and the attachment means provided on the adaptor plate 14, and that the bent portion of the support arm 14 provides a stop means.

The bag 23 may now be attached to the support arm 10 by simply engaging the loop 24 on the hook 25. The open end 43 of the bag 23 may now be placed in juxtaposed relation to the U-shaped frame 17, and by pulling the drawstring 40, margin of the bag is drawn into the channel configuration of the U-shaped frame 17, and the interconnection of the bag 23 to the housing 5 is virtually complete. The final securement is achieved by engaging the bifurcated metal clip 42 on the drawstring 40 adjacent to the grommet 41.

Removal of the catcher bag 23 for emptying purposes may be effectuated simply by pulling free the outer part 11 of the support arm 10 and by lowering the bag 23 to the ground. The drawstring 40 may then be unfastened and the disengagement of the bag 23 from the lawn mower 16 is complete. The bag 23 may be transported to a grass disposal area by holding the outer end 11 in one hand and the drawstring 40 in the other. This will keep the grass clippings inside the bag 23.

Although the invention has been described by making detailed reference to a single preferred embodiment, such detail is to be understood in an instructive instead of any restrictive sense, many variations being possible within the scope of the claims hereunto attended.

I claim as my invention:

1. A grass catcher bag assembly for attachment of a bag to a grass discharge orifice of a lawn mower housing, the assembly comprising:
   (a) an adaptor plate adapted to be attached to the lawn mower housing above the discharge orifice and adapted to partially frame the discharge orifice,
   (b) a single cantilever support arm including an outer end adapted to support the bag and an inner end attached to the adaptor plate,
   (c) framing means adjustably attached to the adaptor plate and cooperating with the adaptor plate to provide a substantially U-shaped orifice frame adapted to receive the open end of the bag, and
   (d) attachment means on the adaptor plate for securing the support arm to the adaptor plate, the attachment means providing couple stabilization of the arm and preventing rotation of the arm.

2. A grass catcher bag assembly as defined in claim 1, in which:
   (e) the adaptor plate includes a support member overhanging the orifice, and
   (f) the framing means includes opposed angle-shaped frames, each frame having one leg member adjustably attached to the overhanging support member and another leg member downwardly depending in substantial marginal register with, and adjacent to the orifice.

3. A grass catcher bag assembly as defined in claim 2, in which:
   (g) each attached leg is connected to the overhanging support member in selectively extensible relation, one of the last said members including a slot and the other of the last members including a hole and a guide finger disposed in spaced relation from each other,
   (h) fastener means extend through the hole and slot and
   (i) the finger engages the member defining the slot to guide the direction of extension of the angle-shaped frames, the finger cooperating with the spaced fastener means to provide a couple resisting pivotal movement of the angle-shaped frames relative to the support member.

4. A grass catcher bag assembly as defined in claim 1, in which:
   (e) the attachment means for the support arm includes a first lug means and a second lug means disposed in spaced relation on the adaptor plate from the first lug means, and
   (f) each lug means engages the inner end of the support arm to provide the couple resistance to movement of the support arm.

5. A grass catcher bag assembly as defined in claim 1, in which:
   (e) the adaptor plate includes a support member overhanging the orifice,
   (f) the framing means includes opposed angle-shaped frames having a substantially channel-shaped cross section, each angle-shaped frame having one leg member adjustably attached to the overhanging support member and another leg member downwardly depending in substantially marginal register with the orifice,
   (g) the attachment means for the support arm includes a first lug means and a second lug means disposed in spaced relation on the adaptor plate from the first lug means, and
   (h) each lug means engages the inner end of the support arm to provide the couple resistance to movement of the support arm.

6. A grass catcher bag assembly for attachment of a bag to a grass discharge orifice of a lawn mower housing, the assembly comprising:
   (a) an adaptor plate adapted to be attached to the lawn mower housing above the discharge orifice and adapted to partially frame the discharge orifice,
   (b) a single cantilever support arm including an outer end adapted to support the bag and an inner end attached to the adaptor plate,
   (c) framing means adjustably attached to the adaptor plate and cooperating with the adaptor plate to provide a substantially U-shaped orifice frame adapted to receive the open end of the bag, and
   (d) attachment means on the adaptor plate for the support arm, the attachment means providing couple stabilization of the arm and preventing rotation of the arm,
   (e) the attachment means for the support arm including a first lug means and a second lug means disposed in spaced relation from the first lug means,
   (f) each lug means engaging the inner end of the support arm to provide the couple resistance to movement of the support arm,
   (g) the inner end of the support arm being substantially arcuate in cross section, and including a pair of opposing elongate edges operatively bearing on the adaptor plate between the first and second lug means,
   (h) the first lug means including a pair of opposed tabs embracingly engaging the inner end of the support arm, and
   (i) the second lug means including an arcuate socket receiving and substantially conforming to the inner end of the support arm.

7. A grass catcher bag assembly for attachment of a bag to a grass discharge orifice of a lawn mower housing, the assembly comprising:
   (a) an adaptor plate adapted to be attached to the lawn mower housing above the discharge orifice and adapted to partially frame the discharge orifice,
   (b) a single cantilever support arm including an outer end adapted to support the bag and an inner end attached to the adaptor plate,
   (c) framing means adjustably attached to the adaptor plate and cooperating with the adaptor plate to provide a substantially U-shaped orifice frame adapted to receive the open end of the bag, and
   (d) attachment means on the adaptor plate for the support arm, the attachment means providing couple stabilization of the arm and preventing rotation of the arm,
   (e) the adaptor plate including a support member overhanging the orifice and providing a support member,
   (f) the framing means including opposed angle-shaped frames having a substantially channel-shaped cross section, each angle-shaped frame having one leg member adjustably attached to the overhanging support member and another leg member downwardly depending in substantially marginal register with the orifice,
   (g) the attachment means for the support arm including a first lug means and a second lug means disposed in spaced relation from the first lug means,
   (h) each lug means engaging the inner end of the support arm to provide the couple resistance to movement of the support arm, (i) the inner end of the support arm being substantially semi-circular in cross section and including a pair of opposing elongate edges bearing on the adaptor plate between the first and second lug means, (j) the first lug means including a pair of opposed tabs inwardly inclined to embracingly engage the inner end of the support arm, (k) the second lug means including a substantially semi-circular socket receiving and conforming substantially to the cross section of the inner end of the support arm, and (l) the support arm including telescopically related, yet detachably connected portions.

References Cited

UNITED STATES PATENTS

| | | | |
|---|---|---|---|
| 3,165,877 | 1/1965 | Leader et al. | 56—202 |
| 3,197,949 | 8/1965 | Waag | 56—202 |
| 3,213,600 | 10/1965 | Anderson | 56—202 |
| 3,230,696 | 1/1966 | Liljenberg | 56—202 |
| 3,246,459 | 4/1966 | Goldberg et al. | 56—202 |
| 3,257,788 | 6/1966 | Pirie | 56—202 |
| 3,374,612 | 3/1968 | Leader | 56—202 |

LOUIS G. MANCENE, Primary Examiner

J. A. OLIFF, Assistant Examiner